United States Patent
Pritchard

(10) Patent No.: US 9,314,813 B2
(45) Date of Patent: Apr. 19, 2016

(54) PRECISION HAND-HELD SYSTEM FOR DISPENSING VISCOUS MATERIALS FROM A FLEXIBLE POUCH AND METHOD OF DISPENSING VISCOUS MATERIALS

(71) Applicant: Fres-co System USA, Inc., Telford, PA (US)

(72) Inventor: Barry Lee Pritchard, Nazareth, PA (US)

(73) Assignee: Fres-co System USA, Inc., Telford, PA (US)

( * ) Notice: Subject to any disclaimer, the term of this patent is extended or adjusted under 35 U.S.C. 154(b) by 0 days.

(21) Appl. No.: 14/519,627

(22) Filed: Oct. 21, 2014

(65) Prior Publication Data

US 2015/0114987 A1    Apr. 30, 2015

Related U.S. Application Data

(60) Provisional application No. 61/895,064, filed on Oct. 24, 2013.

(51) Int. Cl.
| | |
|---|---|
| *B05C 17/01* | (2006.01) |
| *B05C 17/005* | (2006.01) |
| *A47G 19/18* | (2006.01) |
| *A21C 15/00* | (2006.01) |
| *B65D 75/58* | (2006.01) |
| *B65D 83/00* | (2006.01) |

(52) U.S. Cl.
CPC ......... *B05C 17/00583* (2013.01); *A21C 15/005* (2013.01); *A47G 19/183* (2013.01); *B65D 75/5811* (2013.01); *B05C 17/00576* (2013.01); *B05C 17/01* (2013.01); *B05C 17/0123* (2013.01); *B05C 17/0146* (2013.01); *B65D 75/5816* (2013.01); *B65D 75/5822* (2013.01); *B65D 83/0005* (2013.01); *B65D 83/0072* (2013.01)

(58) Field of Classification Search
CPC ............ B05C 17/0123; B05C 17/0146; B05C 17/10576; B05C 17/00583; B05C 17/01; B05C 17/00576; B65D 83/0072; B65D 83/0005; B65D 75/5811; B65D 75/5816; B65D 75/5822; A21C 15/005; A47G 19/83
See application file for complete search history.

(56) References Cited

U.S. PATENT DOCUMENTS

| | | | |
|---|---|---|---|
| 4,711,373 A | 12/1987 | Christine | |
| 5,323,931 A | 6/1994 | Robards, Jr. et al. | |
| 5,443,181 A | 8/1995 | Popp et al. | |
| 5,634,572 A | 6/1997 | Lane, Jr. et al. | |
| 5,931,345 A * | 8/1999 | Lane, Jr. ........... | B05C 17/00583 222/105 |

(Continued)

*Primary Examiner* — Frederick C Nicolas
(74) *Attorney, Agent, or Firm* — Caesar Rivise, PC

(57) ABSTRACT

A precision dispensing system and method of use is disclosed. The system includes a hand-holdable dispensing gun and a flexible pouch for dispensing metered amounts of a flowable material. The pouch is formed of a pair of panels of a flexible sheet material that are sealed together to form a pair of nozzles in communication with the flowable material in the pouch. The panels are cut along lines to form finger grip portions enabling one to tear open the nozzles, while leaving the portion of the pouch that is torn still attached to the pouch. The dispensing gun includes a pair of hinged sections defining an interior chamber. A piston is located at one end of the chamber and an end wall is located at the other end thereof. The end wall has passageway in it and is formed by the hinged sections when they are closed. The pouch is arranged to be disposed within the chamber with its nozzles extending out of the passageway.

15 Claims, 2 Drawing Sheets

(56) References Cited

U.S. PATENT DOCUMENTS

| | | | |
|---|---|---|---|
| 6,478,190 B2 * | 11/2002 | Kuge | B65D 35/28 222/107 |
| 7,775,399 B2 * | 8/2010 | Wood | B05C 17/00513 222/105 |
| 8,381,948 B1 * | 2/2013 | Jian | B65D 75/008 222/107 |

* cited by examiner

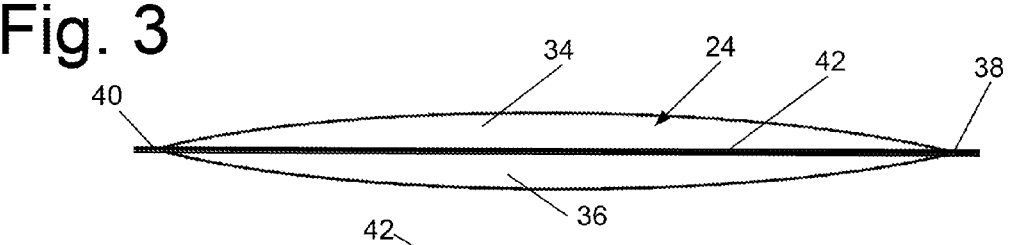
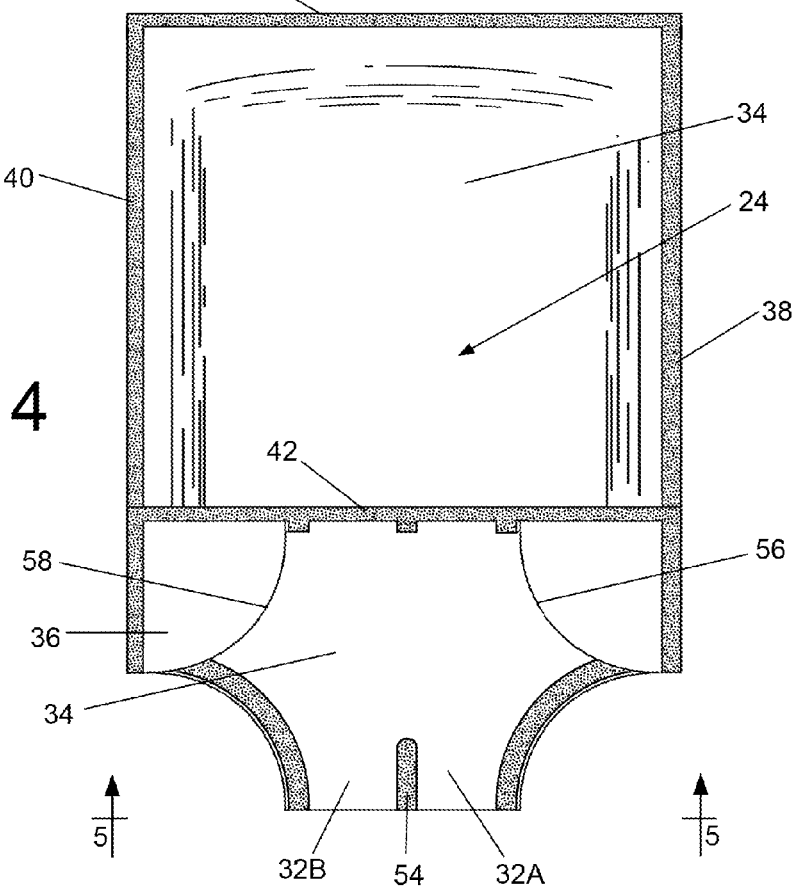
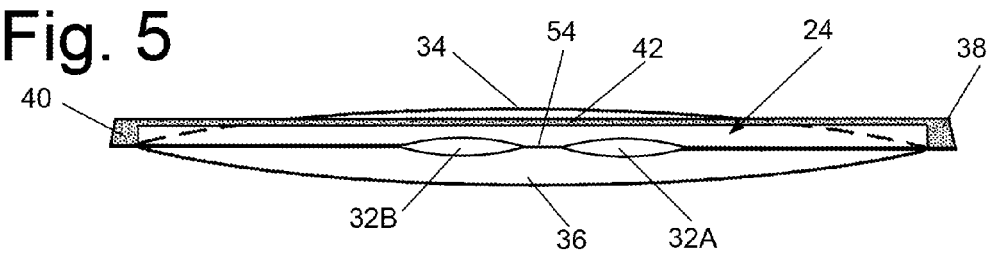

PRECISION HAND-HELD SYSTEM FOR DISPENSING VISCOUS MATERIALS FROM A FLEXIBLE POUCH AND METHOD OF DISPENSING VISCOUS MATERIALS

CROSS-REFERENCE TO RELATED APPLICATIONS

This utility application claims the benefit under 35 U.S.C. §119(e) of Provisional Application Ser. No. 61/895,064 filed on Oct. 24, 2013 entitled Precision Hand-Held System for Dispensing Viscous Materials From a Flexible Pouch. The entire disclosure of this provisional application is incorporated by reference herein.

BACKGROUND OF THE INVENTION

This invention relates to flexible packages and more particularly to hand held dispensing systems for dispensing flowable materials from a flexible pouch.

Some fast food businesses make use of a hand-held dispenser to dispense flowable viscous food products, such as condiments, to the fast food that they offer. The viscous food product, e.g., sour cream, is held within a paperboard tube that is inserted into what amounts to a "caulking gun" type of dispenser to dispense metered amounts of the product onto the food served. While such a caulking gun-paperboard tube dispensing system is generally suitable for its intended purpose, it is desired to replace the paperboard tube with a flexible pouch to reduce the packaging costs and the amount of used packaging waste.

U.S. Pat. No. 4,711,373 (Christine) discloses a portable dispensing system making use of a dispenser for receipt of a fitmentless pouch holding a flowable material, e.g., a condiment. The pouch includes a main body made of a flexible material and a discharge portion which is integral with the main body. The dispenser is in the form of a hollow body with two ends. A head is removably mounted on one end of the body and has an opening therethrough. A piston mechanism is removably mounted at the other end of the body. A valve mechanism for opening in response to pressure created by the piston mechanism is mounted on the head adjacent the opening. The valve mechanism includes a casing, a jaw slidably mounted on the casing for movement between an opened and closed position, and a spring mechanism urging the jaw to the closed position and yielding to pressure increases in the body. The discharge portion of the pouch is arranged to pass through the opening of the head of the dispenser for engagement with the jaw to dispense a metered amount of the flowable material.

Other dispensing systems making use of hand-held dispensers in which flexible pouches containing viscous materials, e.g., condiments, are disclosed in U.S. Pat. No. 5,323,931 (Robards, Jr. et al.) and U.S. Pat. No. 5,634,572 (Lane, Jr. et al.)

While the above identified systems are generally suitable for their intended purposes, they are rather complex.

Thus, a need exists for a simple hand-holdable dispensing system which is easy to use and suitable for dispensing precise metered amounts of a viscous material, e.g., a condiment, from a flexible pouch upon each actuation of the dispenser's trigger and without dripping or oozing of the material from the pouch after each dispensing operation. Moreover, the system should be capable of enabling the ready opening of the pouch for the initial dispensing operation without any portion of the pouch becoming loose and entering the food being prepared. The subject invention addresses those needs.

SUMMARY OF THE INVENTION

One aspect of this invention is a flexible pouch for use in a dispensing gun for dispensing metered amounts of a flowable material disposed within the pouch. The pouch comprises a hollow body formed of a pair of panels of a flexible sheet material. The panels are secured together along a pair of side edges by respective side edge seals and along a front edge by a front edge seal. One of the side edge seals and the front edge seal forms a first corner of the pouch. The other of the side edge seals and the front edge seal forms a second corner of the pouch. The panels at the first corner are secured together by a first corner seal, with the first corner seal forming one side edge of a first dispensing nozzle. The panels at the second corner are secured together by a second corner seal, with the second corner seal forming one side edge of a second dispensing nozzle. The panels are also secured together at an intermediate portion of the front edge seal by an intermediate seal. The intermediate seal forms another side edge of the first nozzle and another side edge of the second nozzle. The panels are cut along first cut lines adjacent to the first corner seal between the first corner seal and the front edge seal to form a first finger grip portion. A portion of each of the panels contiguous with the front edge seal at the nozzles forms a respective tear line along which the panels may be torn by pulling on the first finger grip portion to open the nozzles, and with the portion of the package which is torn along the tear lines remaining secured to other portions of the pouch.

Another aspect of this invention is a precision dispensing system comprising a hand-holdable dispensing gun and a flexible pouch for disposition within the gun for dispensing metered amounts of a flowable material disposed within the pouch. The pouch is constructed as set forth above. The gun comprises a hollow cylinder formed of a pair of hinged sections defining an interior chamber for receipt of the pouch. The chamber has a piston located at one end thereof and an end wall portion at the other end thereon. The end wall portion has a nozzle-receiving passageway therein and is formed by respective end wall sections of the hinged sections conjoining when the hinged sections are closed. The pouch is arranged to be disposed within the chamber of the dispenser with the nozzles extending out of the passageway.

Another aspect of this invention is a method of dispensing metered amounts of a flowable material. That method entails providing a pouch comprising a hollow body formed of a pair of panels of a flexible sheet material. The panels form a chamber in which the flowable material is disposed, with the panels being secured together by a first corner seal and a second corner seal. The first corner seal forms one side edge of a first dispensing nozzle and the second corner seal forms one side edge of a second dispensing nozzle. The panels also secured together an intermediate seal, with the intermediate seal forming another side edge of the first nozzle and another side edge of the second nozzle. Each of the nozzles are sealed by an edge seal. A portion of each of the panels contiguous with the edge seal forms a tear line. The method additionally comprises tearing a portion of the pouch along the tear line to open the nozzles, placing the pouch within a chamber of a hand-holdable dispensing gun, and operating the gun to dispense metered amounts of the flowable material disposed within the pouch through the nozzles.

In accordance with one preferred aspect of the method of this invention the gun comprising a hollow cylinder formed of a pair of hinged sections defining a chamber for receipt of the pouch therein. The chamber includes a piston located at one end thereof and an end wall portion at the other end thereon, with the end wall portion having a nozzle receiving passageway therein. The method additionally comprises placing the pouch within the chamber with the nozzles within the nozzle receiving passageway and with a portion of the pouch adjacent the piston.

In accordance with another preferred aspect of the method of this invention the gun additionally comprises a manually operable trigger coupled to the piston and wherein the method additionally comprises pulling the trigger to operate the gun to dispense metered amounts of the flowable material disposed within the pouch through the nozzles.

In accordance with another preferred aspect of the method of this invention the portion of the pouch which is torn along the tear lines remains secured to other portions of the pouch.

DESCRIPTION OF THE DRAWING

FIG. 3 is an enlarged end view taken along line 3-3 of FIG. 2;

FIG. 4 is a top plan view, like that of FIG. 2, but showing the dispensing pouch after its nozzles have been torn open and a portion of the pouch folded back over itself to ready the pouch for insertion into the dispensing gun of FIG. 1; and FIG. 5 is an enlarged end view taken along line 5-5 of FIG. 4.

DETAILED DESCRIPTION OF THE PREFERRED EMBODIMENT

Figure 1:
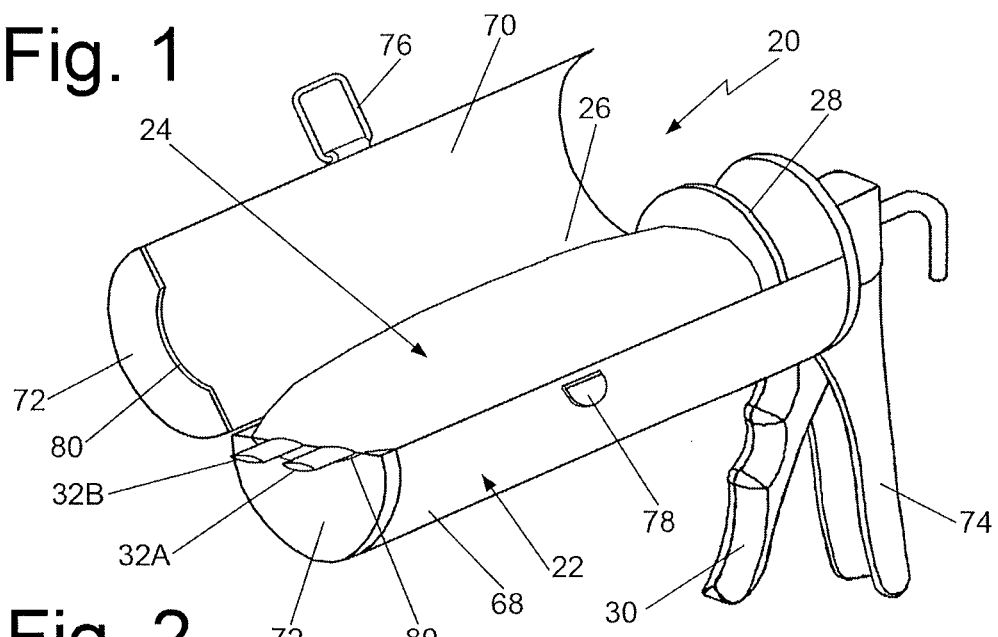
FIG. 1 is an isometric view of one exemplary embodiment of a dispensing gun and a flexible dispensing pouch holding a flowable viscous product forming a precision dispensing system of this invention, with the gun being shown with its cover in the open position, ready to be closed.

Referring now to the various figures of the drawing wherein like reference characters refer to like parts, there is shown at 20 in FIG. 1 one exemplary embodiment of a precision dispensing system constructed in accordance with this invention. The system 20 basically comprises a hand-holdable dispenser in the form of a dispensing gun 22 and a flexible pouch 24 containing a viscous flowable product. The details of the dispensing gun 22 will be described later. Suffice it for now to state that it includes a hollow chamber 26 arranged to receive the flexible pouch 22, a movable piston 28 to engage the pouch and a trigger mechanism 30 to move the piston. The flexible pouch 24 is formed of flexible sheet material which is sealed, as will be described shortly, to form a hollow interior in which the flowable viscous material, e.g., a condiment, such as sour cream, is located. In the exemplary preferred embodiment shown in FIG. 1 the pouch includes a pair of nozzles or spouts 32A and 32B which are initially sealed closed, but are arranged to be torn open. The pouch is arranged to be disposed within the dispensing gun and with its nozzles torn open to enable the flowable material to be dispensed in precisely metered amounts from the pouch through the nozzles when the dispensing gun is operated, e.g., its trigger pulled.

Figure 2:
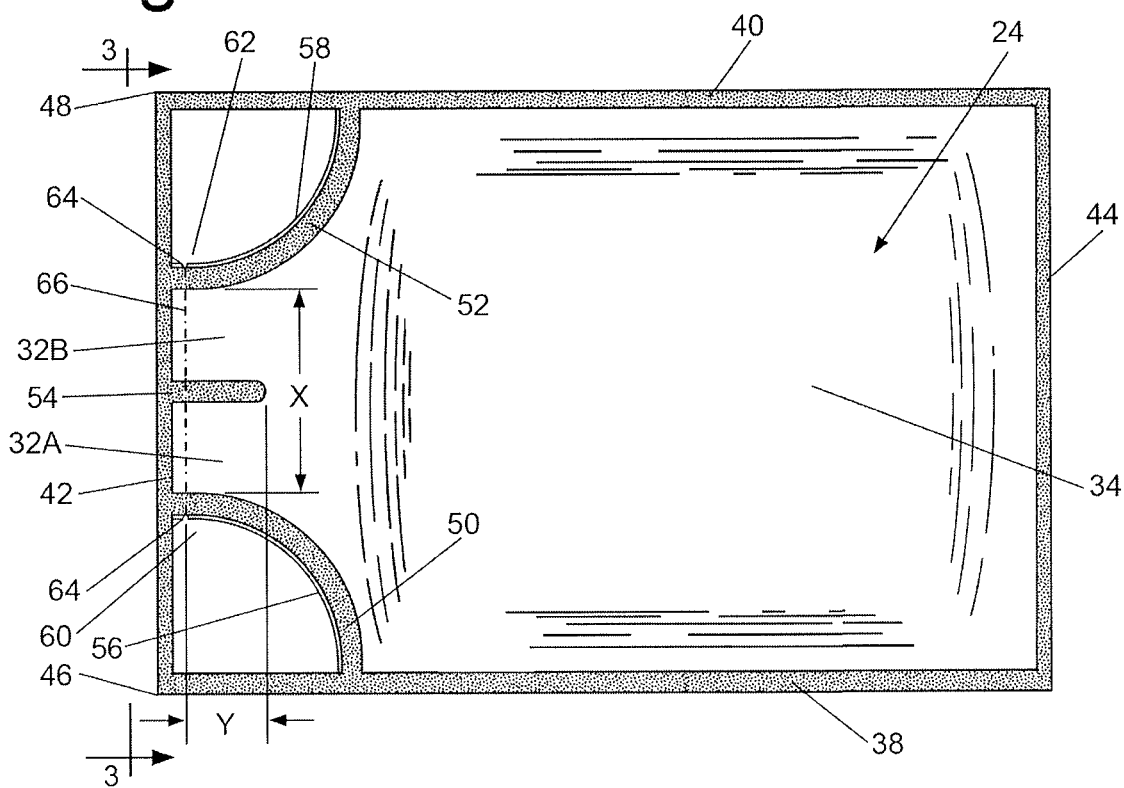
FIG. 2 is an enlarged, top plan view of the dispensing pouch shown in FIG. 1.

The pouch is best shown in FIGS. 2 and 3 and basically comprises a hollow body formed of a pair of panels 34 and 36 of a flexible sheet material, e.g., film. In the embodiment shown the panels are each of rectangular shape and each is of the same size. The panels are disposed over each other and are secured together by various seal lines. The seal lines can be produced utilizing any conventional sealing or bonding technique, e.g., heat sealing, ultrasonic sealing, adhesives, etc. In the exemplary embodiment shown the side edges of the two superimposed panels are secured together by respective side edge seals 38 and 40. They are also secured together along their front edge by a front edge seal 42 and are secured together along their back edge by a back edge seal 44. The side edge seal 38 and the front edge seal 42 form a first corner 46 of the pouch. In a similar manner the side edge seal 40 and the front edge seal 42 form a second corner 48 of the pouch. The panels adjacent the first corner 46 are secured together by a first corner seal 50, while the panels at the second corner 48 are secured together by a second corner seal 52. The corner seals shown in the exemplary embodiment are somewhat arcuate, but can be of other shapes. The first corner seal 50 forms the outside edge of a first dispensing nozzle 32A, while the second corner seal 52 forms the outside edge of a second dispensing nozzle 32A. The panels 34 and 36 are also secured together at an intermediate portion, e.g., the center, of the front edge seal 42 by an intermediate seal 54. The intermediate seal 54 forms the inside edge of the first nozzle 32A and the inside edge of the second nozzle 32B. Both nozzles are of the same size and shape and they are located side-by-side. To that end, the intermediate seal 54 extends parallel to the side edge seals 38 and 40 for a distance of Y, which defines the length of the nozzles 32A and 32B. The combined width of the two nozzles is denoted by X.

In order to enable one to readily tear open the two nozzles, the two panels 34 and 36 are cut along first cut lines 56 and second cut lines 58. The first cut lines 56 are arcuate and located closely adjacent to the first corner seal 50 between the first corner seal and the front edge seal 42. In particular, the first cut line 56 in the top panel 34 is superimposed over the first cut line 56 in the bottom panel 36. Together the two cut lines and the portion of the panels contiguous therewith form a first finger grip portion 60 of the pouch. The first finger grip portion is located laterally of the nozzle 32A. The second cut lines 58 in the two panels 34 and 36 are also arcuate and are located adjacent to the second corner seal 58 between the second corner seal and the front edge seal 42. The second cut line 58 in the top panel 34 is superimposed over the second cut line 58 in the bottom panel 36. Together the second cut lines 58 and the portion of the panels contiguous therewith form a second finger grip portion 62 of the pouch. The second finger grip portion is located laterally of the nozzle 32B.

Each of the cut lines includes a notch 64 in it located adjacent the front edge seal 42 and extending into the associated corner seal. In particular, a notch 64 is located in the first cut line 56 and extends into the corner seal 50, while a similar notch 64 is located in the second cut line 58 and extends into the corner seal 52. The two notches 64 define the opposite ends of a weakened tear line 66 in each of the panels 34 and 36. Those tear lines are superimposed on each other and serve as the line along which the panels can be torn to open the nozzles. To that end, the tear line 66 in each panel extends close and parallel to the front seal 42 across the nozzles. The weakened tear line in each panel can be formed by laser scoring. Alternatively, the material forming the panels can be made of a film with good directional tear properties, such as a PE/PA/PE coextrusion so that the panels will tear in the desired direction when a tear is started from the notch at either end of the tear line.

Opening of the nozzles of the pouch is accomplished in the following manner. Either of the finger grip portions 60 or 62 of the pouch can be gripped between the fingers of the user on each side of the tear notch 64 at that finger grip portion to enable the user to pull the gripped portion away from the remaining portion of the pouch, thereby applying a force to the notch. This action causes the film material at the notch to tear and the tear is propagated along the length of the tear line 66 to the opposite notch 64, thereby opening the two nozzles 32A and 32B.

The portion of the panels that is torn away from the nozzles can then be folded back over itself, like shown in FIGS. 4 and 5, which action gets that portion of the pouch out of the way and holds it in place so that it can't get into the food product. The opened pouch can then be inserted into the dispensing gun 22 to dispense the product therefrom (as will be described later).

As should be appreciated by those skilled in the art from the foregoing, the combination of the cut lines with the tear line enables one to easily open the spouts. Moreover, and quite significantly, the arrangement of the cut lines enables the pouch to have the feature that once it is torn open, the portion of the pouch that is torn away to open the nozzles remains attached to others portion of the pouch. This feature is important to prevent the film that is torn during the pouch's opening from becoming loose and ending up in the food being prepared.

Another important element of converting to a pouch is controlling the exit of the product in a manner consistent with good hygienic practices and most importantly in a controlled accurate manner. For example the current paper board tube uses an integral flexible disk at the product exit which is cut in an "X" pattern to act as a simple shut-off device for the product as the trigger is pulled. The aforementioned prior art U.S. Pat. No. 4,711,373 (Christine) makes use of a spring loaded set of clamping jaws to act as a shut of mechanism in his version of the dispensing gun. The pouch and dispensing gun of this invention are constructed such that no additional shut-off mechanism is needed to cut-off the flow of the product and to prevent unwanted product from oozing out of the pouch after each dispensing operation. This has been achieved by determining the particular nozzle configuration and shape which is optimum for use when dispensing a particular viscous product, such as sour cream, since such a product has a predetermined viscosity which may be dependent on the product's temperature.

A particularly suitable pouch for dispensing metered amounts of sour cream makes use of two nozzles like that described above. The two nozzles create a split stream of the sour cream product exiting the gun when the trigger is actuated. The advantage of utilizing two smaller nozzles in place of one larger nozzle is that if one dispenses a viscous flowable product through a large orifice nozzle it tends to try remain together and won't break off at the end of the trigger pull, thereby hanging on the end of the gun. A smaller cross section nozzle orifice works fine but allows too much back pressure to remain internally in the gun and the product keeps oozing out. Thus a large enough exit area, split into two smaller columns through respective nozzles, allows a low-pressure product exit. The two smaller cross section streams allow the product to break loose and not hang onto a long string.

Turning now back to FIG. 1 the details of the dispensing gun 22 will be described. The gun 22 is a modification of the prior art dispensing gun produced by Prince-Castle. The prior art Prince-Castle gun, being used with a paperboard tube, is not suitable as-is for use with a flexible pouch since the gun is built as half a cylinder. In particular, its construction makes it impossible to apply even pressure to a flexible pouch to dispense its contents. In addition, the front or distal end of the Prince-Castle gun is open to accommodate the spout of the fiberboard tube. Thus, the open end does not provide a backstop for a flexible pouch. Moreover, the Prince-Castle gun makes use of a trigger operated piston whose pushing surface is too small for applying appropriate pressure to a pouch to dispense its contents and is curved along its outer edge, which is not conducive to the application of adequate pressure on a flexible pouch.

Thus, the dispensing gun 22 of subject invention makes use of a pair of semi-cylindrical hollow sections 68 and 70, each of which includes an end wall section 72 (to be described later). The section 70 serves a cover for the gun, while the section 68 serves as the base having the chamber 26 into which the pouch is disposed, such as shown in FIG. 1. The movable piston 28 is located within the chamber 26 at the rear end thereof. The piston is arranged to be advanced down the chamber toward the end wall section 72. To that end, as is conventional, the base section 68 includes a handle 74 and the trigger lever 30. The trigger lever is coupled to the piston 28 so that each pull of the trigger advances the piston a predetermined distance toward the end wall 72. The cover 70 is pivotably connected to the base section by hinges (not shown) and includes a clasp 76 ring for releasably engaging a tab 78 on the base section to lock the cover in place and thereby form an enclosed cylinder holding the pouch 22 therein and providing circumferential support for the pouch during the dispensing operation.

The piston 28 of the gun 22 is of a larger diameter than the piston of the Prince-Castle gun, e.g., the piston diameter matches the inside diameter of the gun's cylinder. As mentioned above, the front end of the cover section 70 and the front end of the base section 66 each include an end wall portion 72. Each of those end wall portions includes a shallow recess 80 in its free edge. The two end wall sections conjoin with each other when the cover section 70 of the gun is closed to form a backstop for the pouch, with the two recesses conjoining each other to form a passageway through which the two nozzles 32A and 32B of the pouch extend. No additional mechanism, such as a duck-bill valve or some other component, is provided in the gun to cut off the flow of the viscous material through the nozzles of the pouch, since such an additional mechanism is unnecessary, i.e., each pull of the trigger ejects a precise metered amount of the viscous material through the nozzles, without any subsequent oozing or leakage. Accordingly, the gun of this invention is simple in construction and easy to keep clean.

The dispensing gun and the pouch can be of any particular size, depending upon the product to be dispensed. For example, a dispensing gun 22 constructed as set forth above can accommodate a 1.6 lb. pouch 24 filled with sour cream. Such a combination can be arranged to expel (dispense) approximately ½ ounce of product per trigger pull. While any conventional sheet material can be used for the pouch, that material must be strong enough to resist the application of pressure during the dispensing process, it must be flexible enough to fill out the gun's internal volume. Thus, pouches in accordance with this invention can be fabricated of any suitable flexible packaging film material, in single or multiple plies.

It should be pointed out at this juncture that pouches constructed in accordance with this invention need not include two nozzles. Thus, for some applications only a single nozzle will suffice. In fact, if desired more than two nozzles can be used for some applications.

As should be appreciated from the foregoing the pouches of this invention include at least one integral nozzle through which the product exits, are easy to manufacture and are designed for easy-opening without use of a knife, scissors or other cutting instrument. The fact that the portion of the pouch which is torn away to open the nozzle(s) remains affixed to the pouch eliminates the possibility for stray packaging film to get into the food being served. The pouch of the subject invention can easily be inserted into the dispensing gun. Printed instructions may be included on each package to facilitate its usage. Moreover, the nozzle(s) of the pouch are symmetrical and exhibit symmetrical tear features, i.e., the pouch can be torn open from either side.

Without further elaboration the foregoing will so fully illustrate my invention that others may, by applying current or future knowledge, adopt the same for use under various conditions of service.

What is claimed is:

1. A flexible pouch for use in a dispensing gun for dispensing metered amounts of a flowable material disposed within said pouch, said pouch comprising a hollow body formed of a pair of panels of a flexible sheet material, said panels being secured together along a pair of side edges by respective side edge seals and along a front edge by a front edge seal, one of said side edge seals and said front edge seal forming a first corner of said pouch, the other of said side edge seals and said front edge seal forming a second corner of said pouch, said panels at said first corner being secured together by a first corner seal, said first corner seal forming one side edge of a first dispensing nozzle, said panels at said second corner being secured together by a second corner seal, said second corner seal forming one side edge of a second dispensing nozzle, said panels also being secured together at an intermediate portion of said front edge seal by an intermediate seal, said intermediate seal forming another side edge of said first nozzle and another side edge of said second nozzle, said panels being cut along first cut lines adjacent to said first corner seal between said first corner seal and said front edge seal to form a first finger grip portion, a portion of each of said panels contiguous with said front edge seal at said nozzles forming a respective tear line along which said panels are adapted to be torn by pulling on said first finger grip portion to open said nozzles, and with the portion of said package which is torn along said tear lines remaining secured to other portions of said pouch.

2. The flexible pouch of claim 1 wherein said panels are also cut along second cut lines adjacent to said second corner seal between said second corner seal and said front edge seal to form a second finger grip portion, said respective tear lines being arranged to be torn by pulling on either said first finger grip portion or said second finger grip portion to open said nozzles.

3. The flexible pouch of claim 1 wherein said first cut line and said corner seal adjacent thereto includes a first notch forming one end of said tear lines.

4. The flexible pouch of claim 2 wherein said first cut line and said corner seal adjacent thereto includes a first notch forming one end of said tear lines and wherein said second cut line and said corner seal adjacent thereto includes a second notch forming a second end of said tear lines.

5. A precision dispensing system comprising a hand-holdable dispensing gun and a flexible pouch for disposition within said gun for dispensing metered amounts of a flowable material disposed within said pouch, said gun comprising a hollow cylinder formed of a pair of pivotably connected sections defining an interior chamber for receipt of said pouch, said chamber having a piston located at one end thereof and an end wall portion at the other end thereon, said end wall portion having a nozzle receiving passageway therein and being formed by respective end wall sections of said pivotably connected sections when said pivotably connected sections are closed;

said pouch comprising a hollow body formed of a pair of panels of a flexible sheet material, said panels being secured together along a pair of side edges by respective side edge seals and along a front edge by a front edge seal, one of said side edge seals and said front edge seal forming a first corner of said pouch, the other of said side edge seals and said front edge seal forming a second corner of said pouch, said panels at said first corner being secured together by a first corner seal, said first corner seal forming one side edge of a first dispensing nozzle, said panels at said second corner being secured together by a second corner seal, said second corner seal forming one side edge of a second dispensing nozzle, said panels also being secured together at an intermediate portion of said front edge seal by an intermediate seal, said intermediate seal forming another side edge of said first nozzle and another side edge of said second nozzle, said panels being cut along first cut lines adjacent to said first corner seal between said first corner seal and said front edge seal to form a first finger grip portion, a portion of each of said panels contiguous with said front edge seal at said nozzles forming a respective tear line along which said panels are adapted to be torn by pulling on said first finger grip portion to open said nozzles, and with the portion of said package which is torn along said tear lines remaining secured to other portions of said pouch, said pouch being arranged to be disposed within said chamber of said dispenser with said nozzles extending out of said passageway.

6. The dispensing system of claim 5 wherein said dispenser includes a trigger coupled to said piston for advancing said piston toward said end wall portion upon actuation of said trigger.

7. The dispensing system of claim 5 wherein said panels are also cut along second cut lines adjacent to said second corner seal between said second corner seal and said front edge seal to form a second finger grip portion, said respective tear lines being arranged to be torn by pulling on either said first finger grip portion or said second finger grip portion to open said nozzles.

8. The dispensing system of claim 5 wherein said first cut line and said corner seal adjacent thereto includes a first notch forming one end of said tear lines.

9. The dispensing system of claim 7 wherein said first cut line and said corner seal adjacent thereto includes a first notch forming one end of said tear lines and wherein said second cut line and said corner seal adjacent thereto includes a second notch forming a second end of said tear lines.

10. A method of dispensing metered amounts of a flowable material disposed within a pouch, said pouch comprising a hollow body formed of a pair of panels of a flexible sheet material, said panels forming a chamber in which said flowable material is disposed and being secured together by a first corner seal and a second corner seal, said first corner seal forming one side edge of a first dispensing nozzle, said second corner seal forming one side edge of a second dispensing nozzle, said panels also being secured together an intermediate seal, said intermediate seal forming another side edge of said first nozzle and another side edge of said second nozzle, each of said nozzles being sealed by an edge seal, with a portion of each of said panels contiguous with said edge seal forming a tear line, said method comprising:

(a) tearing a portion of said pouch along said tear line to open said nozzles:
(b) placing said pouch within a chamber of a hand-holdable dispensing gun; and (c) operating said gun to dispense metered amounts of said flowable material disposed within said pouch through said nozzles.

11. The method of claim 10 wherein said gun comprises a hollow cylinder formed of a pair of pivotably connected sections defining said chamber for receipt of said pouch therein, and wherein said chamber includes a piston located at one end thereof and an end wall portion at the other end thereon, said end wall portion having a nozzle receiving passageway therein and wherein said method comprises:

(d) placing said pouch within said chamber with said nozzles within said nozzle receiving passageway and with a portion of said pouch adjacent said piston.

12. The method of claim 11 wherein said gun additionally comprises a manually operable trigger coupled to said piston and wherein said method comprises:

(e) pulling said trigger to operate said gun to dispense metered amounts of said flowable material disposed within said pouch through said nozzles.

13. The method of claim 10 wherein the portion of said pouch which is torn along said tear lines remains secured to other portions of said pouch.

14. The method of claim 12 wherein the portion of said pouch which is torn along said tear lines remains secured to other portions of said pouch.

15. The method of claim 10 wherein said panels are cut along first cut lines adjacent to said first corner seal between said first corner seal and said edge seal to form a first finger grip portion, with a portion of each of said panels contiguous with said edge seal at said nozzles forming a respective tear line, and wherein said method comprises:

(d) pulling on said first finger grip portion to tear said pouch along said tear lines.

* * * * *